July 21, 1925.
A. SCHNEIDER
1,546,410
ELECTRIC ARC WELDING APPARATUS
Filed May 25, 1923     2 Sheets-Sheet 1
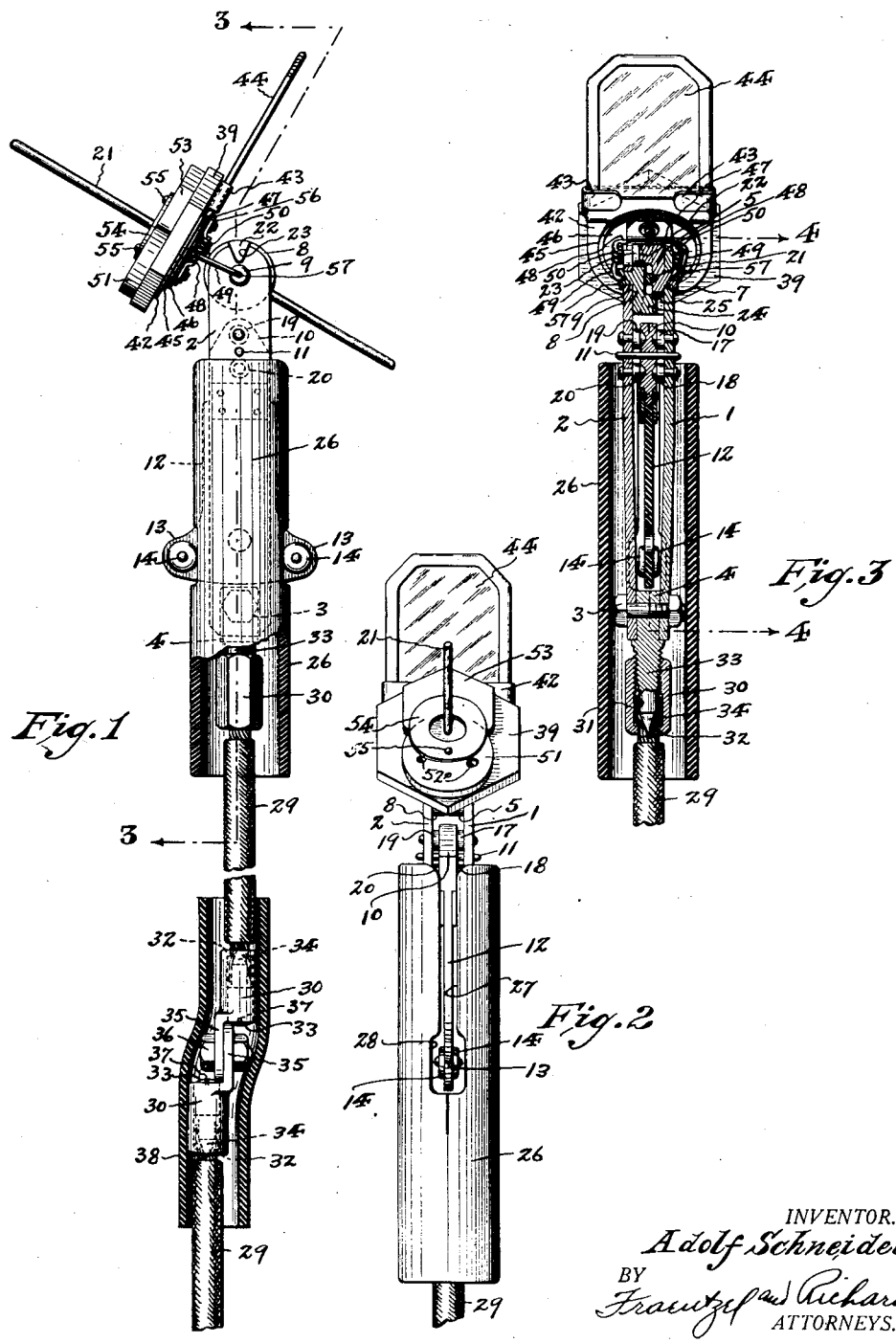
INVENTOR.
Adolf Schneider,
BY
Frantz and Richards
ATTORNEYS.

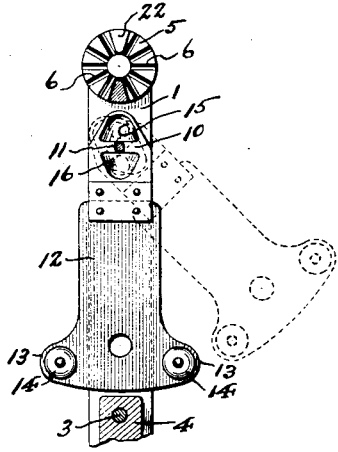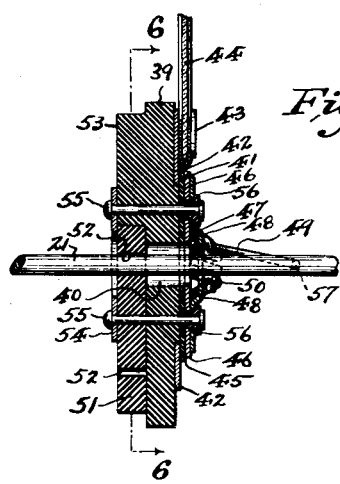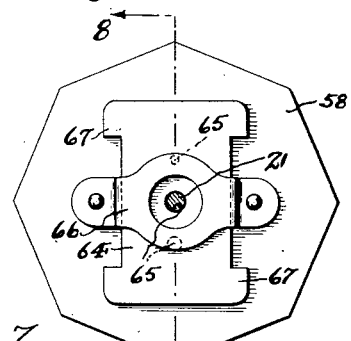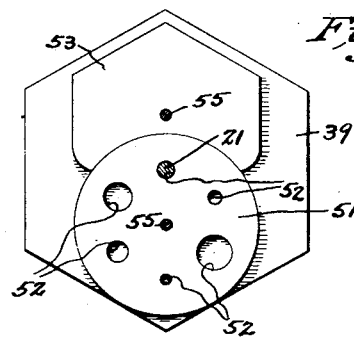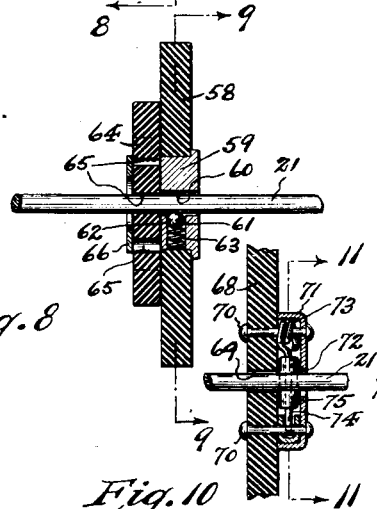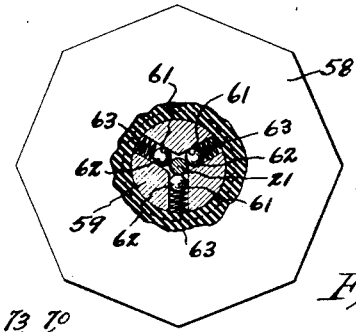

Patented July 21, 1925.

1,546,410

UNITED STATES PATENT OFFICE.

ADOLF SCHNEIDER, OF BROOKLYN, NEW YORK

ELECTRIC-ARC-WELDING APPARATUS.

Application filed May 25, 1923. Serial No. 641,315.

*To all whom it may concern:*

Be it known that I, ADOLF SCHNEIDER, a citizen of the United States, residing at Brooklyn, in the county of Kings and State of New York, have invented certain new and useful Improvements in Electric-Arc-Welding Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in electric holders for electric arc welding apparatus, and the invention has for its principal object to provide a clamp holder for both mechanically holding the wire or electrode to be fused in electric welding operations and electrically connecting the same in circuit.

Another object is to provide a novel shield or guard around the electrode or wire to prevent particles of fused metal falling upon the hand of the operator during operative use of the apparatus.

Another object is to provide a novel arrangement and support of viewing screen in connection with the shield or guard.

Another object is to provide a novel construction of cable shoe or couples for connecting electric current carrying cables both with the holder and with one another, and generally for use with electrical apparatus wherein such cable connections are desirable.

Other objects of this invention, not at this time more particularly enumerated, will be clearly understood from the following detailed description of the same.

With the various objects of this invention in view, the same consists, primarily, in the novel construction of electrode holder for electric arc welding apparatus and associated parts; and, the invention consists, furthermore, in the novel arrangements and combinations of the various devices and parts, as well as in the details of the construction of the same, all of which will be more fully described in the following specification, and then embodied in the appended claims.

The invention is clearly illustrated in the accompanying drawings, in which:—

Figure 1 is a side elevation of the novel electrode holder with the electrode wire operatively mounted therein; Figure 2 is a front elevation of the same; Figure 3 is a vertical longitudinal section of the same, taken on line 3—3 in Figure 1; and Figure 4 is a fragmentary vertical longitudinal section, taken on line 4—4 in Figure 3, the electrode wire and shield or guard element being removed.

Figure 5 is a vertical longitudinal section through the shield or guard member, said view being drawn on an enlarged scale, Figure 6 is a detail transverse section, taken on line 6—6 in Figure 5 the gauge plate and guide block being shown in elevation; Figure 7 is a front face view of a modified form of the novel shield or guard element; Figure 8 is a vertical longitudinal section of the same, taken on line 8—8 in Figure 7; Figure 9 is a transverse section of the same, taken on line 9—9 in Figure 8; Figure 10 is another modified form of shield or guard element; and Figure 11 is a transverse section, taken on line 11—11 in said Figure 10.

Similar characters of reference are employed in all of the hereinabove described views, to indicate corresponding parts.

Referring now to said drawings, the reference characters 1 and 2 respectively indicate the opposed members of a pair of spring clamp-bars, the lower ends of which are rigidly secured by the bolt 3 upon opposite sides of a butt-block 4. The inherent tension of said clamp-bars tend to normally move the free ends of the same toward one another. Arranged at the upper free end of the clamp-bar 1, and upon the inner face of the same, is a gripping-jaw 5 provided in its face with a plurality of diametrically extending V-shaped receiving grooves 6. Said gripping-jaw 5 has a central integral rivet-lug 7 projecting from its rear or outer side to extend through said clamp-bar 1, the free end of which is riveted over the outer face of said clamp-bar 1, to thus firmly secure said gripping-jaw 5 to said clamp-bar 1. In like manner, arranged at the upper free end of the clamp-bar 2, and upon the inner face of the same so as to be opposed to said gripping-jaw 5, is the opposite gripping-jaw 8, the face of which is preferably of convex conformation. Said gripping-jaw 8 also has a central integral rivet-lug 9 projecting from its rear or outer side to extend through said clamp-bar 2, the free end of which is riveted over the outer face of said clamp-bar 2, to thus firmly secure said gripping-jaw 8 to said clamp-bar 2.

The means for spreading said clamp-bars and their gripping-jaws apart for the insertion therebetween of an electrode or welding wire or rod, comprises a pivoted cam-plate 10 fulcrumed upon a cross-pin 11 extending through the clamp-bars in a position spaced downwardly from the gripping-jaws. Rigidly connected with the lower end of said cam-plate 10 is a hand-lever 12 which is made of a suitable insulating material, and which is widened out at its lower free end to provide laterally projecting ears or wings 13, having attached to each side buttons or bosses 14 which aid the fingers of the operator when grasping the hand-lever to swing the same outward to actuate the cam-plate. Said cam-plate and its hand-lever are thus disposed intermediate the clamp-bars 1 and 2. The cam-plate 10 is provided on each face, respectively above and below the point of its pivotal connection with the cross-pin 11, with an upper concave or dished cam-depression 15 and a lower concave or dished cam-depression 16. Riveted to the clamp-bar 1, so as to project inwardly therefrom, and so as to respectively normally seat themselves in the cam-depressions 15 and 16 on one side of said cam-plate 10, are spreader studs 17 and 18; and, in like manner, riveted to the clamp-bar 2, so as to project inwardly therefrom, and so as to respectively normally seat themselves in the cam-depressions 15 and 16 on the opposite side of said cam-plate 10, are spreader studs 19 and 20. When the cam-plate 10 is turned on the cross-pin 11 in either direction, the respective sets of spreader studs are caused to ride up out of the cam depressions 15 and 16, thus spreading apart the clamp-bars 1 and 2 and consequently likewise spreading apart the gripping-jaws 5 and 8, so that a welding wire 21 may be passed between the latter and disposed at the desired angle of projection therefrom by selectively engaging the welding wire 21 with one of the V-shaped receiving grooves 6 of the gripping-jaw 5. When the welding wire 21 is thus placed, the cam-plate is swung back to normal initial position, whereupon the clamp-bars 1 and 2 and gripping-jaws 5 and 8 moved toward each other, under the tension of the former, thus firmly gripping and holding the welding wire in rigid connection with the holder. In order to interlock the clamp-jaws 5 and 8, and the clamp-bars 1 and 2 upon which they are respectively mounted, against lateral displacement with relation one to the other, the gripping-jaw 5 is provided at its upper portion with a lug 22 which engages or enters a corresponding cut away portion or notch 23 of the opposed gripping-jaw 8; and, in like manner, the said gripping-jaw 8 is provided at its lower portion with a similar lug 24 which engages or enters a corresponding cutaway portion or notch 25 of the gripping-jaw 5.

The lower portions of the clamp-bars and devices associated therewith are enclosed in a sleeve 26 of suitable insulating material, which provides a non-conducting hand-grip, by means of which the operator may safely grasp and control the device when in use. Said insulating sleeve 26 is provided at each side with a slot 27 having an enlarged portion 28 at its lower end through which may project a wing 13 of the hand-lever 12 of the cam-plate 10. The said slots 27 and their enlarged portions 28 permit the outward swinging of said hand-lever 12 in either direction, when it is desired to open the clamp-jaws.

Said clamp-bars 1 and 2, the butt-block 4, and the gripping-jaws 5 and 8 are all electrical conductors, and are adapted to form a part of the feed circuit supply current to the welding-wire 21, and consequently means are provided for connecting a service cable of electrical feed conductor with said butt-block. This connecting or coupling means comprises a cable shoe or coupler of novel form, and of very efficient character, and one which requires no solder or other similar means for securely engaging in good electrical contact, the end of a cable or feed conductor 29 with the holder device. The said cable shoe or coupler consists of a female member 30 having a longitudinal bore 31, of somewhat larger diameter than the cable to be inserted therein, which is internally threaded at its upper end, and provided at its lower with an internal annular shoulder 32. Connected integrally with said butt-block 4, so as to project downwardly therefrom, is an externally threaded male member 33 having at its free end a conical or pointed wedge-plug 34. The end of the cable 29 is inserted through the lower open end of said female member 30 to pass the annular shoulder 32 and enter the bore 31. The upper end of said female member 30 is then threaded on to the male member 33, which passes downwardly through the bore 31 until the conical wedge plug 34 engages the inserted end of the cable. As the said conical wedge plug 34 penetrates the strands making up the cable 29, it parts the same, forcing or spreading the said strands outwardly in all directions toward the sides of the bore 31, thus binding the strands against the said sides of the bore, while the conical wedge plug 34 penetrates the lower opening of the female member to firmly wedge the strands, by a strong pinching action, between the annular shoulder 32 and said conical wedge plug 34, thereby not only firmly binding the cable against withdrawal from the female member, but also assuring a positive electrical contact between the cable and the members of the cable shoe or coupler.

It is frequently desirable to couple lengths of the current delivering feed cable together, so as to conveniently carry the electrode holder a desired distance away from the source of current supply. Two such lengths of cable may be thus coupled together by connecting with the meeting or adjoining ends thereof cable shoes or couplers of the general character above described, the free ends of the female members 30 of such shoes or couplers having perforate ears 35 which may be lapped and secured together by a bolt 36. The male member 33 is then provided at its outer end with a transverse slot 37, so that the same may be manipulated with a screw-driver when operatively assembling the male and female members together. This arrangement is illustrated in Figure 1 of the drawings. When such a connection has been made, the bare interconnected cable shoes or couplers may be covered with a sleeve 38 of insulating material to protect the operator from electrical shock when handling the cable.

It will also be understood that the novel cable shoes or couplers may be used for connecting cable in various ways or to various kinds of electrical apparatus, and to this end may be provided with various shapes of perforate ears to suit the character of connection desired to be made.

Referring now to Figures 1, 2, 3, 5 and 6, I have illustrated therein one form of the novel shield or guard element employed in connection with my electrode holder. This shield or guard element comprises a main body 39 of any desired peripheral shape. This main body 39 is made preferably of a material which is both non-combustible and an electrical non-conductor, such for example as asbestos, and the same is provided with a central perforation or passage 40. Formed in connection with the back of said main body 39 is a circular boss 41, upon which is engaged, so as to swivel or turn thereon, an adjustable clip plate 42 having at its free end a pair of laterally disposed and opposed clip-arms 43 to embrace and hold a viewing-screen element 44, which is preferably made of dark colored mica, smoked or dark colored glass or other partially transparent medium through which the operator may comfortably view the intensely bright flame of the electric arc produced when the tool is in use. The clip-plate 42 is retained against displacement from said boss 41 by means of a washer 45 of insulating material. Overlying the outer side of said washer 45 is a perforate plate 46, upon the outer face of which is mounted a perforate keeper plate 47 having an outwardly off-set portion which serves to retain or anchor intermediate the same and said plate 46 the base-portions 48 of a pair of spring bail members 49, which project rearwardly from the back of the shield or guard element, and which respectively possess convoluted portions 50, the tension of which tends to press the bail portions inwardly or toward one another. Mounted to turn on the face of said main body 39 is a gauge-plate 51 provided with a concentric row of variously sized perforations 52 corresponding to a plurality of different gauges or sizes of welding wires which the holder is adapted to accommodate. Said perforations 52 are so disposed, that by turning the gauge plate 51 any one of the same may be registered or alined with the central passage 40 of the main body 39. Rigidly connected with the face of the main body 39 to abut the upper edge of said gauge-plate 51 is a guide-block or boss 53 against which the gauge-plate turns, and which supports the same against displacement from normal operative position. Placed over the gauge-plate 51 and guide-block or boss 53, and centrally relative to the main body 39 is a perforate washer 54. The parts above described are all secured together by transverse rivets 55, one of which constitutes the axial bearing of the rotatable gauge-plate 51. Insulator sleeves 56 surround the rearward ends of said rivets 55 to insulate the same from electrical contact with the plate 46 and keeper plate 47. The free ends of the bail members 49 are provided with inwardly directed journal portions 57 which are engaged in seats provided in the outer ends of the rivet-lugs 7 and 9 of the jaw-members 5 and 8 thus pivotally connecting the shield or guard element with the electrode holding device. When inserting a welding wire 21 between the gripping-jaws 5 and 8, an opening or perforation 52 of the gauge-plate 51 corresponding to the size of the welding wire 21 is registered with the passage 40 of the main body 39 of the shield or guard element, and as the welding wire 21 is passed through the gripping jaws at a desired angle of projection, the shield or guard element is swung on the pivotal connection provided by the bail members to oppose the passage 40 to the forward free end of said welding wire, which is thereupon thrust outwardly through said passage 40, and the opening 52 of the gauge plate 51 alined therewith, so that said forward free end projects outwardly for the desired distance beyond the outer or front face of the shield or guard element, the latter then being disposed at right angles to the axis of said welding wire, in which position it will readily shield the hand of the operator grasping the holder from falling sparks or molten metal dropping from the forward end of the welding wire during the electric welding operations, it being understood that the shield or guard element will in no way interfere with the handling of the holder, or in any way obstruct or prevent a proper and convenient direction and engagement of the welding wire relative to the work when such operations are carried on. In addition to the protection thus afforded by the shield or guard member, the adjustable screen or viewing glass is conveniently located so that the operator may easily watch the operation without being disturbed by the brilliancy of the electric arc formed by the contact of the welding wire with the work, in the manner familiar to those skilled in the art.

Referring now to Figures 7, 8 and 9, I have illustrated therein a somewhat modified form of shield or guard element, the same comprising a main body 58 of any desired peripheral shape, and preferably made of asbestos. Centrally imbedded in said main body 58 is a center block 59 provided with a central perforation or passage 60. Extending radially from said central perforation or passage 60 are a plurality of openings 61 in the inner ends of which are arranged gripping balls 62 which are thrust inwardly by compression springs 63. When the welding wire 21 is thrust through the passage 60, the balls 62 yield to the passage of the same, but are thrust strongly into gripping relation to the sides thereof to thus hold the main body 58 in assembled or attached relation thereto, so that the shield or guard element is operatively disposed relative to the free end of the said welding wire. If desired said main body may be provided on its forward face with an adjustable gauge plate 64 provided with a plurality of variously sized perforations 65 corresponding to a plurality of different gauges or sizes of welding wires. Said gauge plate 64 is mounted for sliding movement across the face of said main body 58, and to such end a central perforate clip or yoke plate 66 is secured to said main body for both holding and guiding the movement of said gauge-plate. Said gauge plate is provided with enlarged ends 67 for limiting the adjusting movement thereof in each direction. It will be seen that this modified construction of shield or guard element is self-retained in connection with the welding wire, and thus eliminates any necessity for employing a bail connection between the same and clamp or gripping devices of the holder proper.

In Figures 10 and 11 I have illustrated a modified form of retaining means for engaging a shield or guard element with the welding wire. In this form the reference character 68 indicates the main body of a shield or guard element, the same having a central opening or passage 69. Secured to the rear face of said main body 68, by rivets 70 or other suitable fastening means, is a housing 71 having a central opening or perforation 72 alined with the passage 69 of said main body. Secured around one of the fastening rivets 70, within the interior of the housing 71 is a spring-member 73 the ends of which terminate in supporting or journal arms 74 extending longitudinally through said housing. Rotatably mounted on each journal arm 74 is a gripping roller 75. The tension of the spring 73 tends to normally move the journal arms 74 and the gripping rollers 75 mounted thereon toward one another. When the welding wire 21 is inserted through the perforation 72 and thence through the passage 69 of the main body 68, it passes between said gripping rollers 75, and when a proper adjustment is made disposing the shield or guard element relative to the free end of the welding wire, the spring tension thrusts the rollers 75 into strong gripping relation to the welding wire, whereby the shield or guard element is self-retained in connection with the latter.

I am aware that some changes may be made in the various arrangements and combinations of the several devices and parts of my present invention, without departing from the scope thereof as above described and as defined in the appended claims. Hence, I do not limit my invention to the exact arrangements and combinations as described in the foregoing specification, nor do I confine myself to the exact details of the construction of said parts as illustrated in the accompanying drawings.

I claim:—

1. In a device of the kind described, a pair of spring clamp-bars fixed together at their lower ends, means for coupling a feed cable with the lower ends of said clamp-bars, opposed gripping jaws fixed respectively to the upper free ends of said clamp-bars, a cam-plate pivotally mounted intermediate said clamp-bars, spreader studs fixed to said clamp-bars to operatively engage said cam-plate, an insulated hand-lever connected with the lower end of said cam-plate to normally extend rearwardly between said clamp-bars, said hand lever having laterally and oppositely extending wings at its free end, and an insulated tubular hand-grip means surrounding said clamp-bars, said hand-grip means having slots on opposite sides thereof to permit the outward projection respectively therethrough of said wings of the cam-plate hand-lever.

2. In a device of the kind described, a pair of spring clamp-bars fixed together at their lower ends, means for coupling a feed cable with the lower ends of said clamp-bars, opposed gripping jaws fixed respectively to the upper free ends of said clamp-bars, one of said gripping jaws having a plurality of diametrically disposed receiving grooves in its gripping face to selectively seat a welding wire between said gripping jaws at a desired selected angle of projection therethrough, a cam-plate pivotally mounted intermediate said clamp-bars, spreader studs fixed to said clamp-bars to operatively engage said cam-plate, a hand-lever connected with the lower end of said cam-plate to normally extend rearwardly between said clamp-bars, said hand lever having laterally and oppositely extending wings at its free end, an insulated tubular hand-grip means surrounding said clamp-bars, said hand-grip means having slots on opposite sides thereof to permit the outward projection respectively therethrough of said wings of the cam-plate hand-lever.

3. In a device of the kind described, a pair of spring clamp-bars having opposed gripping-jaws at their upper free ends, a butt-block intermediate the lower ends of said clamp-bars to which the latter are fixed, means disposed intermediate said clamp-bars operatable to spread apart the same to separate the gripping-jaws for the insertion or withdrawal of a welding wire, an insulated hand grip surrounding the lower portions of said clamp-bars, a shield member having a central passage through which the forwardly projecting end of said welding wire extends, and means for retaining said shield member in assembled association with said welding wire and the holding means therefor.

4. In a device of the kind described, a pair of spring clamp-bars having opposed gripping-jaws at their upper free ends, a butt-block intermediate the lower ends of said clamp-bars to which the latter are fixed, means disposed intermediate said clamp-bars operatable to spread apart the same to separate the gripping-jaws for the insertion or withdrawal of a welding wire, an insulated hand grip surrounding the lower portions of said clamp-bars, a shield member having a central passage through which the forwardly projecting end of said welding wire extends, means for retaining said shield member in assembled association with said welding wire and the holding means therefor, and an adjustable gauge-plate mounted on the face of said shield member having a plurality of variously sized gauge openings for selective alinement with the central passage of said shield member.

5. In a device of the kind described, a pair of spring clamp-bars having opposed gripping-jaws at their upper free ends, a butt-block intermediate the lower ends of said clamp-bars to which the latter are fixed, means disposed intermediate said clamp-bars operatable to spread apart the same to separate the gripping-jaws for the insertion or withdrawal of a welding wire, and insulated hand grip surrounding the lower portions of said clamp-bars, a shield member having a central passage through which the forwardly projecting end of said welding wire extends, means for retaining said shield member in assembled association with said welding wire and the holding means therefor, a clip-plate mounted upon the rear face of said shield member to swivel in a plane parallel to the plane of the latter, and a viewing screen element supported by said clip-plate to project outwardly from the periphery of said shield member.

6. In a device of the kind described, a pair of spring clamp-bars having opposed gripping-jaws at their upper free ends, a butt-block intermediate the lower ends of said clamp-bars to which the latter are fixed, means disposed intermediate said clamp-bars operatable to spread apart the same to separate the gripping-jaws for the insertion or withdrawal of a welding wire, an insulated hand grip surrounding the lower portions of said clamp-bars, a shield member having a central passage through which the forwardly projecting end of said welding wire extends, means for retaining said shield member in assembled association with said welding wire and the holding means therefor, and adjustable gauge-plate mounted on the face of said shield member having a plurality of variously sized gauge openings for selective alinement with the central passage of said shield member, a clip-plate mounted upon the rear face of said shield member to swivel in a plane parallel to the plane of the latter, and a viewing screen element supported by said clip-plate to project outwardly from the periphery of said shield member.

7. In a device of the kind described, a pair of spring clamp-bars fixed together at their lower ends, means for coupling a feed cable with the lower ends of said clamp-bars, opposed gripping jaws fixed respectively to the upper free ends of said clamp-bars, a cam-plate pivotally mounted intermediate said clamp-bars, spreader studs fixed to said clamp-bars to operatively engage said cam-plate, an insulated hand-lever connected with the lower end of said cam-plate, an insulated tubular hand-grip means surrounding said clamp-bars, said hand-grip means having slots on opposite sides thereof to permit the movement therethrough of said cam-plate hand-lever, a shield member having a central passage through which the forwardly projecting end of a welding wire extends from said gripping jaws, and spring-pressed bail members fixed to and projecting rearwardly from said shield member, the free ends of said bail-members being journaled in connection with said clamp-bars and their gripping-jaws so that said shield member may swing about the axis of the latter.

8. In a device of the kind described, a pair of spring clamp-bars fixed together at their lower ends, means for coupling a feed cable with the lower ends of said clamp-bars, opposed gripping jaws fixed respectively to the upper free ends of said clamp-bars, a cam-plate pivotally mounted intermediate said clamp-bars, spreader studs fixed to said clamp-bars to operatively engage said cam-plate, an insulated hand-lever connected with the lower end of said cam-plate, an insulated tubular hand-grip means surrounding said clamp-bars, said hand-grip means having slots on opposite sides thereof to permit the movement therethrough of said cam-plate hand-lever, a shield member having a central passage through which the forwardly projecting end of a welding wire extends from said gripping jaws, spring-pressed bail members fixed to and projecting rearwardly from said shield member, the free ends of said bail-members being journaled in connection with said clamp-bars and their gripping-jaws so that said shield member may swing about the axis of the latter, an adjustable gauge-plate mounted on the face of said shield member having a plurality of variously sized gauge openings for selective alinement with the central passage of said shield member.

9. In a device of the kind described, a pair of spring clamp-bars fixed together at their lower ends, means for coupling a feed cable with the lower ends of said clamp-bars, opposed gripping jaws fixed respectively to the upper free ends of said clamp-bars, a cam-plate pivotally mounted intermediate said clamp-bars, spreader studs fixed to said clamp-bars to operatively engage said cam-plate, an insulated hand-lever connected with the lower end of said cam-plate, an insulated tubular hand-grip means surrounding said clamp-bars, said hand-grip means having slots on opposite sides thereof to permit the movement therethrough of said cam-plate hand-lever, a shield member having a central passage through which the forwardly projecting end of a welding wire extends from said gripping jaws, spring-pressed bail members fixed to and projecting rearwardly from said shield member, the free ends of said bail-members being journaled in connection with said clamp-bars and their gripping-jaws so that said shield member may swing about the axis of the latter, a clip-plate mounted upon the rear face of said shield member to swivel in a plane parallel to the plane of the latter, and a viewing screen element supported by said clip-plate to project outwardly from the periphery of said shield member.

10. In a device of the kind described, a pair of spring clamp-bars fixed together at their lower ends, means for coupling a feed cable with the lower ends of said clamp-bars, opposed gripping jaws fixed respectively to the upper free ends of said clamp-bars, a cam-plate pivotally mounted intermediate said clamp-bars, spreader studs fixed to said clamp-bars to operatively engage said cam-plate, an insulated hand-lever connected with the lower end of said cam-plate, an insulated tubular hand-grip means surrounding said clamp-bars, said hand-grip means having slots on opposite sides thereof to permit the movement therethrough of said cam-plate hand-lever, a shield member having a central passage through which the forwardly projecting end of a welding wire extends from said gripping jaws, spring-pressed bail members fixed to and projecting rearwardly from said shield member, the free ends of said bail-members being journaled in connection with said clamp-bars and their gripping-jaws so that said shield member may swing about the axis of the latter, an adjustable gauge-plate mounted on the face of said shield member having a plurality of variously sized gauge openings for selective alinement with the central passage of said shield member, a clip-plate mounted upon the rear face of said shield member to swivel in a plane parallel to the plane of the latter, and a viewing screen element supported by said clip-plate to project outwardly from the periphery of said shield member.

11. The combination with an electric arc welding electrode of a shield member having a central passage through which said electrode extends, means for retaining said shield member in assembled association with said electrode, and an adjustable gauge-plate mounted on the face of said shield member having a plurality of variously sized gauge openings for selective alinement with the central passage of said shield member.

In testimony, that I claim the invention set forth above I have hereunto set my hand this 23rd day of May, 1923.

ADOLF SCHNEIDER.

Witnesses:
GEORGE D. RICHARDS,
ADOLPH HANSEN.